Sept. 16, 1941.                W. P. BOMAR                2,256,453
                          INDUSTRIAL LIFT TRUCK
                            Filed June 18, 1940

INVENTOR
WILLIAM P. BOMAR
BY Chapin & Neal
ATTORNEYS

Patented Sept. 16, 1941

2,256,453

UNITED STATES PATENT OFFICE 2,256,453

INDUSTRIAL LIFT TRUCK

William P. Bomar, Fort Worth, Tex.

Application June 18, 1940, Serial No. 341,095

6 Claims. (Cl. 214—113)

This invention relates to an improvement in elevator or lift trucks of the power type commonly used in picking up a loaded pallet or platform, moving such pallet from one place and depositing it at another. The pallet consists of a platform on "skids" or any suitable support to hold it high enough for prongs or a permanent platform of the truck to get underneath the pallet and lift. The elevator truck structure is generally well known and in wide use.

My improvement is directed to a special mode of operation in handling a piled-up load and its pallet. An example is a pile of many bags of flour on one pallet operated on in the new way. So far as I know there is no prior art power truck adapted to move a load of this kind while on the pallet and deposit the load without the pallet, while maintaining the pile of bags in good form. The utility of my improved truck is in the saving of much time and labor in performing the new operation.

When loads are moved from place to place in one industrial plant or mill, the pallet may conveniently go with the load in most cases. But when loads are to be shipped out of the plant by freight car or truck, the pallets cannot go along economically. They would take up valuable shipping space over long distances and they would be lost to the owner. For this reason the common prior art practice has been a hand unloading of the pile on the pallet and a re-piling by hand in the freight car or truck. This is no longer necessary by reason of my improved truck.

I am aware of prior art trucks with means for unloading their platforms in ways that are different. An example is in the patent to Streeter No. 1,556,262, of 1925.

I will now disclose my improved truck combination by reference to the accompanying drawing. It is somewhat diagrammatic for the reason that the truck structure without my improvement is too well known to need any detailed description of the old parts here.

In the drawing—

Figure 1:
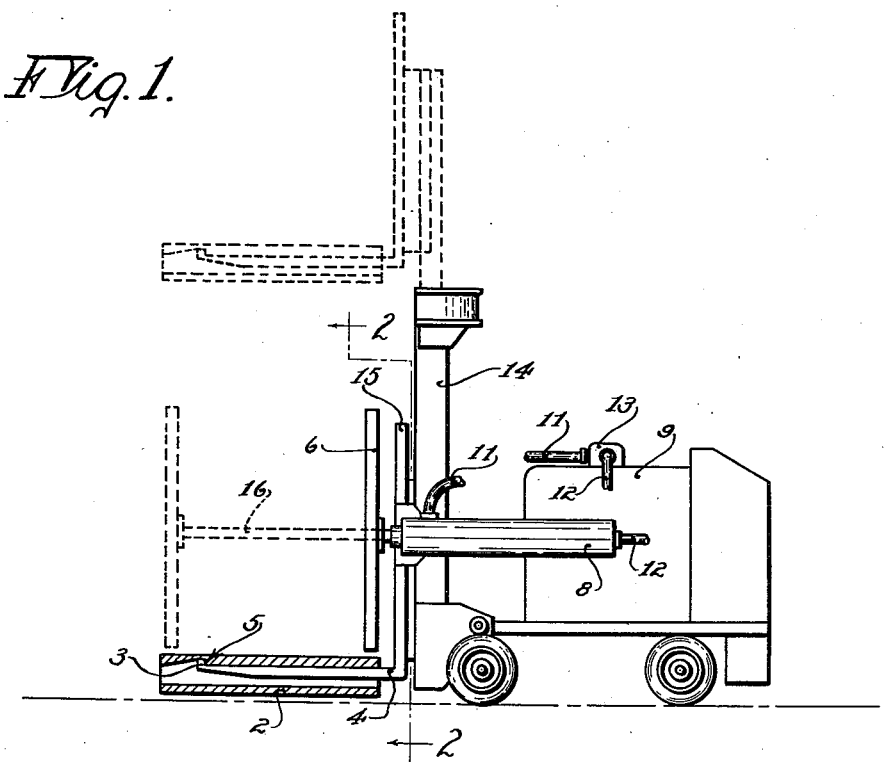
Fig. 1 is a side view indicating one of the many forms of industrial lift trucks and showing the way my improvement may be combined with a truck of this kind.
Figure 2:
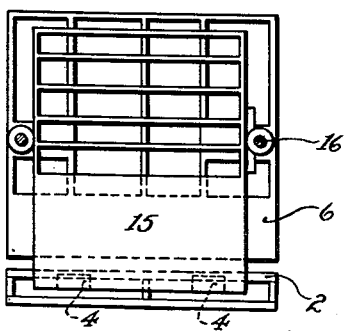
Fig. 2 is a section on line 2—2 of Fig. 1.

In Fig. 1 the operator stands on a platform at the rear; the battery 9 is used to furnish power for a motor which drives the truck wheels and other parts of the truck mechanism in a well known manner. The frame 14 contains a vertically reciprocable elevating mechanism, and part 15 carries two horizontal prongs 4. The latter are arranged like a fork, one on each side. Assume that the load-carrying pallet 2 is resting on the floor. The truck is operated to project prongs 4 under the pallet. Then the truck parts operate to lift the pallet and its load off the floor for moving the load. This latter position is indicated. The truck parts may lift the load to a considerable height, as indicated by the upper dotted line position of parts. They may also tip frame 15 backwardly to carry the pallet parallel to an incline. All this is generally well known in the commercial and prior patented art of power lift trucks.

The new parts in combination with the truck are the following: The prongs 4 are provided with means to function as lugs 3 will. They engage in recesses 5 provided in the under side of the pallet platform. If there is no objection to having the prongs 4 long enough, lugs 3 might engage the end edge of the platform. The function is to prevent the pallet 2 moving off the prongs when the load is pushed off the pallet.

The means to push the load off consists in the pusher plate 6 mounted at the ends of piston rods 16, movable by pistons in hydraulic cylinders 8. The latter are mounted one on each side of frame 15 and travel with this frame. The power is served to the cylinders from a motor-driven rotary pump 13 through flexible hose 11 and 12. It will be clear that pump 13 may be operated in one direction or the other to apply its power output to one or the other side of a piston in cylinder 8. The two cylinders 8 are connected for power in the same manner. The motor driven pump 13 is conveniently a reversible motor controlled by a switch at the operator's panel board, not shown. The flexible hose 11 and 12 and the arrangement of parts stated permit the pusher plate 6 to operate, no matter at what elevation the prongs 4 may be.

The new result made possible by the improved truck relates mainly to the handling of piled loads such as flour bags.

Figure 3:
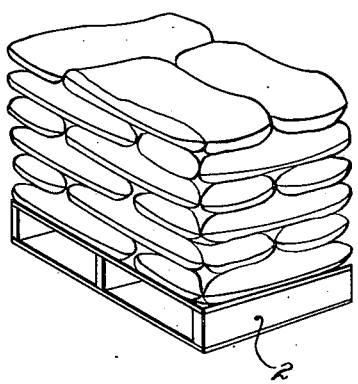
Fig. 3 is an indication of a pallet holding a pile of flour bags.

An example is found in a flour mill. With the new truck the following operation can be carried out. At a station to which filled flour bags are being delivered, they may be taken off a conveyer and piled on pallets. One of these with its load is indicated in Fig. 3. The truck can transport this load as a unit, to the plant warehouse. When a freight car needs to be filled, the truck picks this load up as a unit, moves it into the freight car, locates it substantially in the position it is to occupy during travel, and in this position the following operations are performed. The truck is backed out carrying its fork or prongs 4 at the same time the load pusher is power-driven forwardly in relation to the truck. The speeds of the truck backwardly and the pusher forwardly should be substantially such as to maintain the load of piled bags stationary. The truck movement operates to draw the pallet backwards from under the load while the pusher movement holds the load substantially stationary while the pallet moves backwards. There is considerable weight on the pallet so that it is desirable to have its load-supporting surface with an anti-friction character. This may be done in many ways, one being merely a very smooth surface. As the pallet is slipping from under its load the pusher movement compensates for the pallet's movement. Since the pusher extends upwardly to support the back side of the piled bags, the tendency for the bags to move backwardly is overcome by the forward movement of the pusher relatively to the truck, resulting in overcoming that tendency for the bags to move. The bags do drop downwardly as the pallet is slipped from underneath. This drop need only be the vertical height of the pallet plus the very small distance which the truck holds the pallet above the floor or top of a previously deposited pile, desirable to escape friction at the bottom in the pallet movement. As the operation is performed the flour bag pile will not be upset. The forward lower edge of the pile will first contact with the floor or other surface while the main weight of the pile is still on the pallet. Then the pile will progressively move onto the floor as the pallet is withdrawn. A pile of considerable height and weight can be handled safely in this manner. However, the operator can control movements of backing up the truck and moving the pusher forward in unloading the truck, for satisfactory performance by usual motor controls, one for the truck movement and one for the pusher movement.

Ordinarily, the load on the truck can be moved to abut against the wall of the freight car or against the wall of previously unloaded bags. In this position the load pusher can be power-operated by its pump motor to unload. In this operation the pusher holds the load against the wall. The power operating the pusher 6 may push the truck backwards and the relative movement of truck and pusher is obtained without using the power ordinarily used to drive the truck.

The main result of either of the above described operations is that a freight car or truck may be loaded from a warehouse supply of flour bags in unit piles on pallets, all without loading the pallets by hand and without re-piling the bags from the pallets and in the car. This is the main result conceived and attained by means of the new industrial truck combination.

Of course the new truck is adapted for many other uses as well as the one fully described for flour mills. The scope of the invention is defined by a fair construction of the annexed claims.

I claim:

1. In an industrial truck of the power-operated type adapted to lift and move a load while it rests on a pallet, the combination of means to deposit the load without the pallet, such means consisting of a device to temporarily fasten a loaded pallet against movement with relation to the truck part which directly supports it, a pusher frame mounted vertically on the truck for horizontal movement between the rear and front edges of the pallet, and power means to cause such pusher movement relatively to the pallet to unload the latter and deposit its load when the pallet is fastened for the purpose, said means to so deposit the load being adapted to operate to keep the pusher and load substantially stationary while the truck backs away from the place of deposit.

2. The combination of claim 1 having its pusher frame large enough to engage the back side area of substantially the whole load carried on the pallet.

3. The combination of claim 1 having the device to temporarily fasten a loaded pallet to the truck automatically operable for the purpose when the truck engages and lifts the pallet to move it.

4. An industrial truck adapted to lift and move a loaded platform stand or pallet including a load-lifting horizontal portion to extend underneath the platform, means on such portion engageable with the platform to prevent their relative sliding while the load slides off the platform, piston-operated pusher means engageable with the back side of a load on the platform to deposit such load without the platform and power means mounted on the truck to operate said pusher as the truck is backed away from the place of load deposit and at a pusher speed related to the backing truck speed so as to hold the load substantially still and against horizontal movement during the period of deposit.

5. In an industrial power truck of the type adapted to lift a loaded pallet vertically from the floor and move it to a point of load deposit, the combination of the load carrying frame part with a horizontal portion to engage, support and lift the pallet from underneath and the vertical portion or part of such truck to help steady the load during its movement from place to place, a vertical load pusher frame mounted to move with said carrying frame and also movable horizontally without engaging said pallet, power means for said pusher operable to hold the pusher and the load on the pallet substantially stationary while the truck is operated to back away with the pallet from the place of depositing the load, and means on the truck to releasably engage and draw the pallet back with it in such operation.

6. A power-operated truck constructed to lift and carry piled loads on pallets one after the other, said truck having mechanism under the truck driver's control to lift a loaded pallet, carry it to a place of deposit and deposit the load in such place while retaining its piled form, either with or without the pallet according solely to the manipulation of the truck at the option of the driver, said mechanism including in combination a vertically arranged pusher adapted to engage the back side of the pile, means to move said pusher relatively and without interference and from one end to the other of the pallet while so engaged with the load pile, said truck during said pushing movement being adapted to back away relatively to the load engaged by the pusher, means on the truck adapted to engage and draw the pallet from under its load while the truck is backed away and the load is finally deposited without the pallet.

WILLIAM P. BOMAR.